United States Patent [19]

DiSanto et al.

[11] Patent Number: 5,223,115
[45] Date of Patent: Jun. 29, 1993

[54] ELECTROPHORETIC DISPLAY WITH SINGLE CHARACTER ERASURE

[75] Inventors: Frank J. DiSanto, North Hills; Denis A. Krusos, Lloyd Harbor, both of N.Y.

[73] Assignee: CopyTele, Inc., Huntington Station, N.Y.

[21] Appl. No.: 752,184

[22] Filed: Aug. 23, 1991

Related U.S. Application Data

[63] Continuation of Ser. No. 699,216, May 13, 1991, abandoned.

[51] Int. Cl.[5] .......................... G09G 3/34; G09G 3/00
[52] U.S. Cl. ............................ 204/299 R; 204/180.1; 340/787
[58] Field of Search ......... 204/180.1, 299 R, 299 EC; 340/787, 788, 716; 313/517, 518, 483; 359/296, 297

[56] References Cited

U.S. PATENT DOCUMENTS

| | | | |
|---|---|---|---|
| 4,045,327 | 8/1977 | Noma et al. | 204/180.1 X |
| 4,093,534 | 6/1978 | Carter et al. | 204/180.1 X |
| 4,123,346 | 10/1978 | Ploix | 204/180.1 X |
| 4,218,302 | 8/1980 | Dalisa et al. | 204/180.1 X |
| 4,324,456 | 4/1982 | Dalisa | 259/296 |
| 4,522,472 | 6/1985 | Liebert et al. | 340/787 |
| 4,655,897 | 4/1987 | DiSanto et al. | 204/299 R |
| 4,680,103 | 7/1987 | Solomon et al. | 204/299 R |
| 4,732,830 | 3/1988 | DiSanto et al. | 204/299 R X |
| 4,742,345 | 5/1988 | DiSanto et al. | 340/787 |
| 4,772,820 | 9/1988 | DiSanto et al. | 313/583 |

Primary Examiner—John Niebling
Assistant Examiner—John S. Starsiak, Jr.
Attorney, Agent, or Firm—Arthur L. Plevy

[57] ABSTRACT

A triode type electrophoretic display includes a pair of substantially identical glass faceplates sealed against a peripheral sealing wall to form a fluid-tight envelope for containing an electrophoretic fluid. A first faceplate bears the anode which is composed of a plurality of elongated substantially parallel horizontal conductor members disposed within a first plane and a plurality of elongated substantially parallel vertical conductor members. The horizontal and vertical members are insulated from each other by interstitial insulator strips underlying the vertical members and by a $SiO_2$ layer. The vertical and horizontal members are slotted and grouped into groups so that the area of the intersection of a vertical group and a horizontal group approximates that of a single character. The cathode and grid are formed on the other faceplate in essentially the same manner as the composite anode. By placing the proper voltages on the horizontal and vertical elements of the anode, selective characters may be erased from the display.

26 Claims, 3 Drawing Sheets

ELECTROPHORETIC DISPLAY WITH SINGLE CHARACTER ERASURE

This is a continuation of application Ser. No. 07/699,216, filed May 13, 1991 now abandoned.

FIELD OF THE INVENTION

The present invention relates to electrophoretic displays, and more particularly to a display capable of selective erasure of displayed data.

DESCRIPTION OF THE PRIOR ART

Electrophoretic displays are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. The inventors herein also have several applications relating to electrophoretic displays presently pending in the Patent Office. Three such applications which may have some relevance to the present invention are application Ser. No. 07/375,056 entitled ELECTROPHORETIC DISPLAY PANEL WITH SELECTIVE LINE ERASURE, application Ser. No. 07/667,630 entitled ELECTROPHORETIC DISPLAY PANEL WITH PLURAL ELECTRICALLY INDEPENDENT ANODE ELEMENTS and application Ser. No. 07/345,825 entitled DUAL ANODE FLAT PANEL ELECTROPHORETIC DISPLAY APPARATUS, each of which shall be described below to point out their potential relevance.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic field and the charge on the pigment particles. The electrophoretic display apparatus taught in the foregoing U.S. Patents are "triode-type" displays having a plurality of independent, parallel, cathode row conductor members deposited in the horizontal on one surface of a glass viewing screen. A layer of insulating photoresist material deposited over the cathode members and photoetched down to the cathode members to yield a plurality of insulator strips positioned at right angles to the cathode members, forms the substrate for a plurality of independent, parallel column grid conductor members running in the vertical direction. A glass cap member forms a fluid-tight seal with the viewing window along the cap's peripheral edge for containing the fluid suspension and also acts as a substrate for an anode plate deposited on the interior flat surface of the cap. When the cap is in place, the anode surface is in spaced parallel relation to both the cathode members and the grid members. Given a specific particulate suspension, the sign of the electrostatic charge which will attract and repel the pigment particles will be known. The cathode member voltage, the anode voltage, and the grid member voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid members to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of a pigment particle. The bit may be erased, e.g., upon a reversal of polarity and a logical zero-zero state occurring at the intersection coordinated with an erase voltage gradient between anode and cathode. In this manner, digitized data can be displayed on the electrophoretic display.

To be useful as a display, an electrophoretic display must be able to assume a blank or erased state; must be able to display character data written during a Write operation; and must be able to continually maintain or hold the written characters (and blank characters) in a Hold mode until they are erased or overwritten. These three modes of operation, i.e., Erase, Write and Hold are well documented in existing patents issued to the inventors herein. Certain aspects of these modes of operation are repeated herein, however, for the convenience of the reader. See U.S. Pat. No. 4,947,157 "APPARATUS AND METHODS FOR PULSING THE ELECTRODES OF AN ELECTROPHORETIC DISPLAY FOR ACHIEVING FASTER DISPLAY OPERATION" issued on Aug. 7, 1990 to Frank DiSanto et al. and assigned to CopyTele, Inc.

Given a multi-element cathode and multi-element grid structure as described above, a planar anode, electrically negative, light-colored pigment particles, and a dark-colored, electrically-neutral suspension, the anode face can be completely darkened and the cathode face simultaneously completely lightened by applying a sufficiently large negative voltage on the anode. This condition causes the light-colored, negatively charged particles to migrate from the anode to the cathode. On the way to the cathode, the negative particles will pass through the grid which would be maintained at a voltage permitting passage of the particles therethrough, for example, at zero voltage. Once the anode and cathode screens are rendered monochromic by virtue of the accumulation of negatively-charged, light-colored pigment particles on the cathode elements and the absence of pigment particles on the anode, the respective screens may be deemed "erased".

In any event, if reference is made to the above-noted patents, one will see that such cells or electrophoretic displays essentially contain an anode, a cathode and a grid electrode which grid electrode further controls the transportation of charged particles. In operation, the charged particles are transferred and forced against one electrode, as the anode or cathode under the influence of an applied electric field, so that the viewer may view the color of the pigment which forms a desired display pattern. In this manner the grid electrode is employed to enable control of the migration of such particles. It is also indicated that when the polarity of the field is reversed, the pigment particles are transported and packed on the opposite electrode. This is indicative, for example, of an erasing mode.

The normal voltages on a typical electrophoretic panel enable the following conditions of operation. The panel can be operated in an Erase Mode where the anode electrode is negative with respect to the cathode electrode which is positive. In this mode the grid electrodes are at a low potential which is equivalent for example to a binary 0. In a Hold Mode the anode is positive, the cathodes are positive and the grid electrodes are essentially at zero voltage or at binary 0 level. As one can understand, the cathode operates between zero and positive voltages while the grid operates between low ("0") and high voltages ("1").

As indicated above, a low condition will be indicated by a binary 0 and a high condition is indicated by a binary 1. In any event, during a Write Mode the anode is positive, the cathodes that are being written into are at zero potential and the grids, which are the writing grids, are at a positive or high potential as a binary 1. During this mode all non-writing cathodes are positive and non-writing grids are at low potential or more negative than the cathode.

Application Ser. No. 07/667,630 relates to another structure for an electrophoretic display in which the previously described grid of electrically independently controllable elements is replaced with a monolithic or electrically continuous grid with pores therein. Further, the monolithic anode is replaced with a plurality of discrete, electrically independent elements. In displays constructed in accordance with the teachings of the aforesaid application, pixel writing and erasure is accomplished by impressing a voltage gradient between a selected anode element and a selected intersecting cathode element such that at their point of intersection, the gradient is sufficient to overcome a constant barrier voltage on the monolithic grid element and cause migration of pigment particles past the grid.

Application Ser. No. 07/344,825 relates to an electrophoretic display having a plurality of independent cathode and grid elements. In addition to a monolithic anode plate (remote anode), a plurality of discrete local anode elements are formed atop and in parallel to either the grid or cathode elements with a corresponding plurality of insulator strips positioned therebetween. This structure is achieved, inter alia, by employing different metals for grid and local anode and performing a two step etching to form these elements. Selective erasure at the pixel level may be performed by establishing a sufficient voltage gradient at an intersection point of a selected cathode and grid member relative to the remote anode and lowering the potential of the local anode element crossing the particular intersection to ground potential thereby permitting particle passage.

Application Ser. No. 07/375,056 relates to an electrophoretic display of a type having a plurality of independent cathode and grid elements. The anode is, however, divided into a plurality of discrete elements. In Application Ser. No. 07/375,056, a selected line, rather than the entire display screen, can be erased during an erase operation. The independent anode elements are separately addressable and therefore the erase voltage can be impressed upon any selected anode element to erase a line of characters from the display screen. In accordance with the foregoing principles, the typical screen has about 25 horizontal lines for character text; the individual anode elements are approximately 25 in number; and there is one anode element aligned with a corresponding horizontal line of text. All the pixels of an entire line may therefore be erased by impressing the erase voltage upon the corresponding anode element. This feature is beneficial in that the entire screen need not be erased and rewritten when sequential screens differ only slightly. If only the display data which has changed is erased and rewritten, screen rewrite time is saved and display energy requirements are reduced.

Whereas the above-described applications teach multi-element anodes for use with a monolithic grid; dual anodes, one being monolithic and the other discrete elements parallel to the grid elements for erasure of single pixels; and, in one instance, single line erasure of an electrophoretic display by means of a multi-element anode, there is no prior teaching concerning a display having a cathode and grid structure like that shown, e.g., in U.S. Pat. No. 4,742,345 and having the capacity to selectively erase a single character.

It is therefore an object of the present invention to provide such an electrophoretic display.

SUMMARY OF THE INVENTION

The problems and disadvantages associated with the selective erasure of conventional electrophoretic displays are overcome by the present invention which includes an electrophoretic display having a fluid-tight envelope with a portion thereof which is at least partially transparent. An electrophoretic fluid is contained within the envelope and has pigmented particles suspended therein. An addressable matrix permits the selective erasing of characters from the display by emitting a localized electrostatic charge at selected locations proximate the characters to be erased thus causing the dispersion of agglomerated pigment particles making up the characters without disturbing neighboring characters. the envelope and a first plurality of elongated substantially parallel vertical conductor members are contained within the envelope electrically insulated from the horizontal members and disposed within a second plane. The first and second planes are substantially parallel and the first plurality of horizontal members and the first plurality of vertical members form a first matrix with a plurality of intersections when viewed along a line perpendicular to the first and second planes. A second plurality of elongated substantially parallel horizontal conductor members are disposed within a third plane and contained within the envelope. A second plurality of elongated substantially parallel vertical conductor members are also contained within the envelope electrically insulated from the second plurality of horizontal members and disposed within a fourth plane. The third and fourth planes are substantially parallel and the second plurality of horizontal members and the second plurality of vertical members form a second matrix with a plurality of intersections when viewed along a line perpendicular to the third and fourth planes. The second and third planes are substantially parallel, each of the vertical and horizontal members in the first and second matrices being selectively electrically chargeable to induce movement of the particles within the fluid, the particles being at least partially visible through the transparent portion of the envelope.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
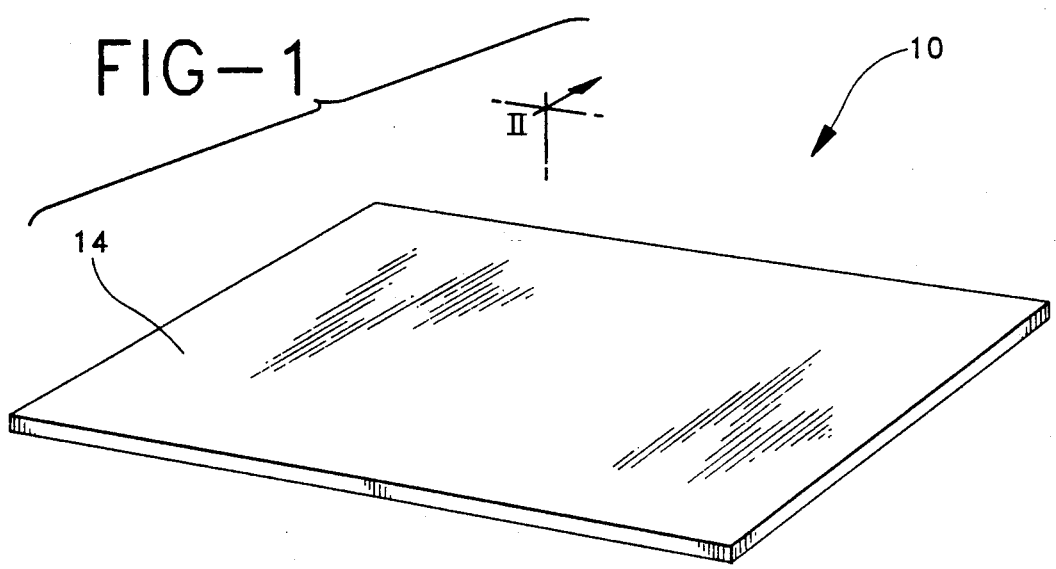
FIG. 1 is an exploded perspective view of an electrophoretic display in accordance with an exemplary embodiment of the present invention.
Figure 1:
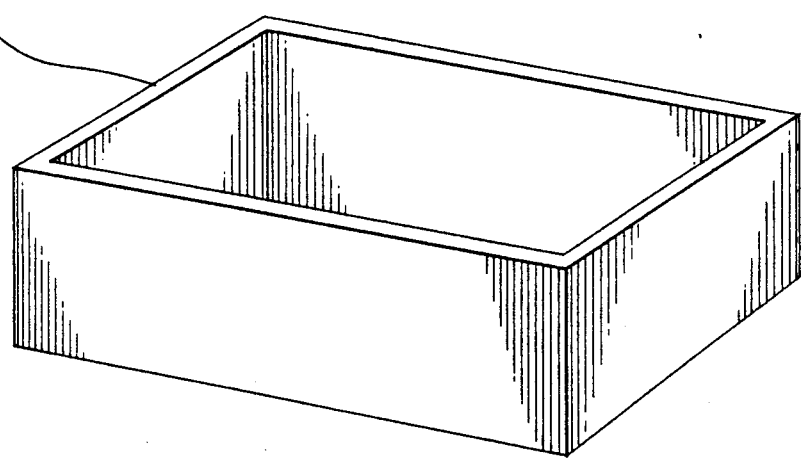
Figure 1:
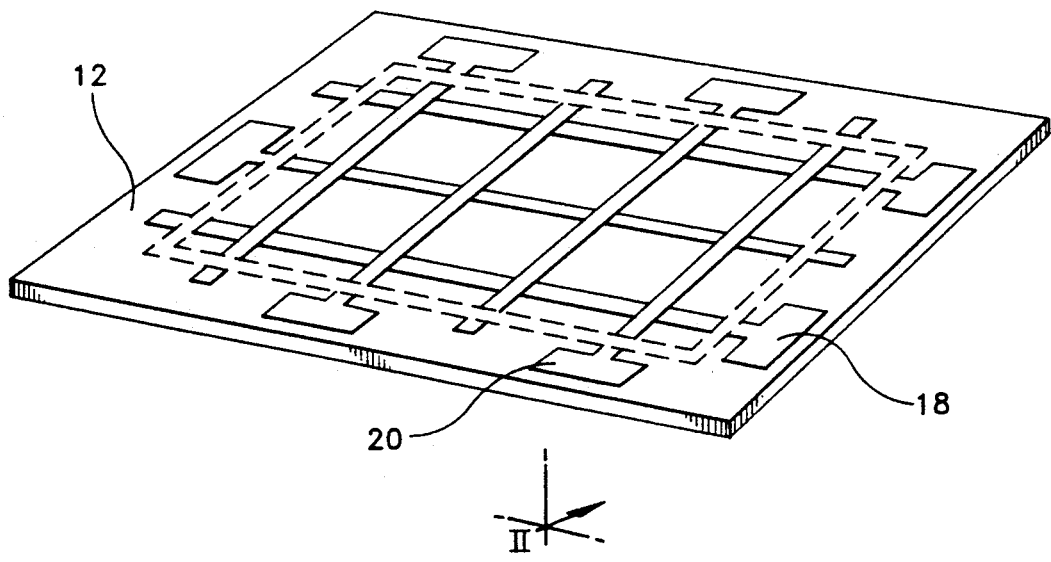

FIG. 1 shows an electrophoretic display 10 in accordance with the present invention. The display 10 has an anode faceplate 12 and a cathode faceplate 14 which are sealably affixed on either side of an interstitial wall 16 to form a fluid tight envelope for containing dielectric/pigment particle suspension or electrophoretic fluid (not shown). The faceplates 12 and 14 are typically flat glass plates upon which are deposited conductor elements for controlling the electrostatic charge for inducing motion in the electrophoretic fluid. The techniques, materials and dimensions used to form conductor elements upon the cathode faceplate, i.e., the cathode and grid, are shown in U.S. Pat. Nos. 4,655,897, 4,732,830 and 4,742,345 which patents are incorporated herein by reference.

In the present invention, the conductor members on the anode faceplate 12 are configured very similarly to those of the known cathode faceplate 14. In particular, the horizontal anode elements 18 are produced by etching an Indium-Tin-Oxide (ITO) coated glass plate. The present invention differs from previous constructs, however, in that a layer of Silicon Dioxide $SiO_2$ is then deposited over the etched ITO glass surface. Following deposition of the $SiO_2$, the conventional construct is continued, i.e., a layer of insulator is then deposited over the $SiO_2$ layer and the insulator is coated with a metal. The metal is then etched to produce the vertical anode elements 20. Only a few horizontal 18 and vertical 20 anode members are depicted for ease of illustration. Similarly, the shape and proportions of the elements depicted are for purposes of illustration only. In actual displays there are many more elements, e.g., 640 horizontal members and 1280 vertical members. It is common in the art to refer to conductor members like 18 and 20 as "lines". Conductor members oriented in a first direction, such as the horizontal members 18, are frequently described as extending in the "x-direction". The vertical members 20 could then be said to run in the "y-direction", so that when viewed along a line approximately perpendicular to the planes containing the "x" and "y" lines, the x and y lines form a cartesian coordinate system or an x-y matrix. As is known in the art, an x-y matrix of electrically chargeable lines can, via appropriate circuit drivers connected to the lines, be "addressed", such that at any given intersection in the matrix can be impressed with a desired voltage. This construct has been employed in the cathode-grid matrix described in the above referenced patents issued to the inventors herein. The horizontal and vertical members are grouped, however, as shall be described below. U.S. Pat. Nos. 4,742,345 and 4,772,820 may be referred to for more verisimilar illustrations of electrophoretic display elements. Essentially then, the anode faceplate 12 and the elements 18 and 20, with the exception of the $SiO_2$ layer, have the same basic form as known cathode/grid faceplates. The horizontal anode elements 18 are etched on ITO coated glass as are the conventional horizontal cathode members. The vertical anode elements 20 are superimposed on the horizontal members and are insulated therefrom by an interstitial photoresist layer as the grid members are insulated from the cathode members. The vertical anode elements are formed by coating the photoresist layer with a metal, such as, nickel, using sputtering techniques, or the like, and then masked and etched like the conventional grid elements. Thus, the anode is a matrix of a plurality of elongated, parallel, horizontal members 18 upon which is superimposed a plurality of elongated parallel vertical members 20, a strip of insulator electrically and physically separating the two sets of anode elements.

Figure 2:
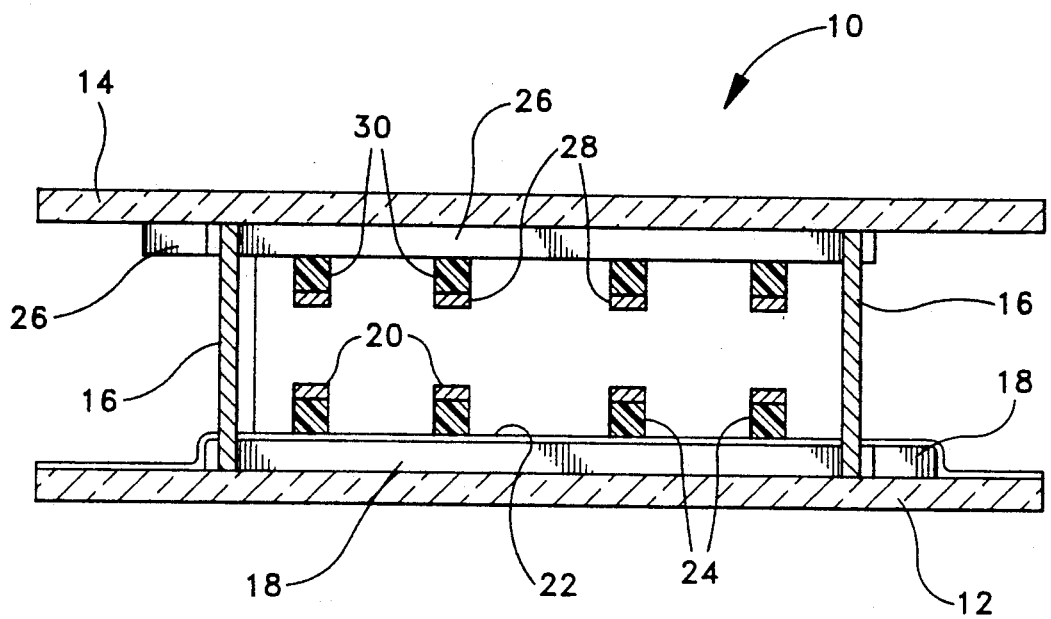
FIG. 2 is a cross-sectional view of the electrophoretic display shown in FIG. 1 in the unexploded state, taken along section line II—II and looking in the direction of the arrows.

FIG. 2 shows the electrophoretic display of FIG. 1 assembled and in cross-section. The $SiO_2$ layer 22 deposited over the horizontal anode elements 18 and the supporting anode faceplate 12 surface is visible in this view. Similarly, the remnants of the etched anode insulation layer, i.e., the anode insulator strips 24 can be seen in FIG. 2. An examination of the upper portion of FIG. 2 reveals the cathode elements 26, grid elements 28 and grid insulator strips 30 as are known in the art. All conductor elements are quite thin and extend beneath the interstitial wall 16 at at least one end thereof to provide a terminal exterior to the envelope for connecting display driver circuitry (not shown).

Figure 3:
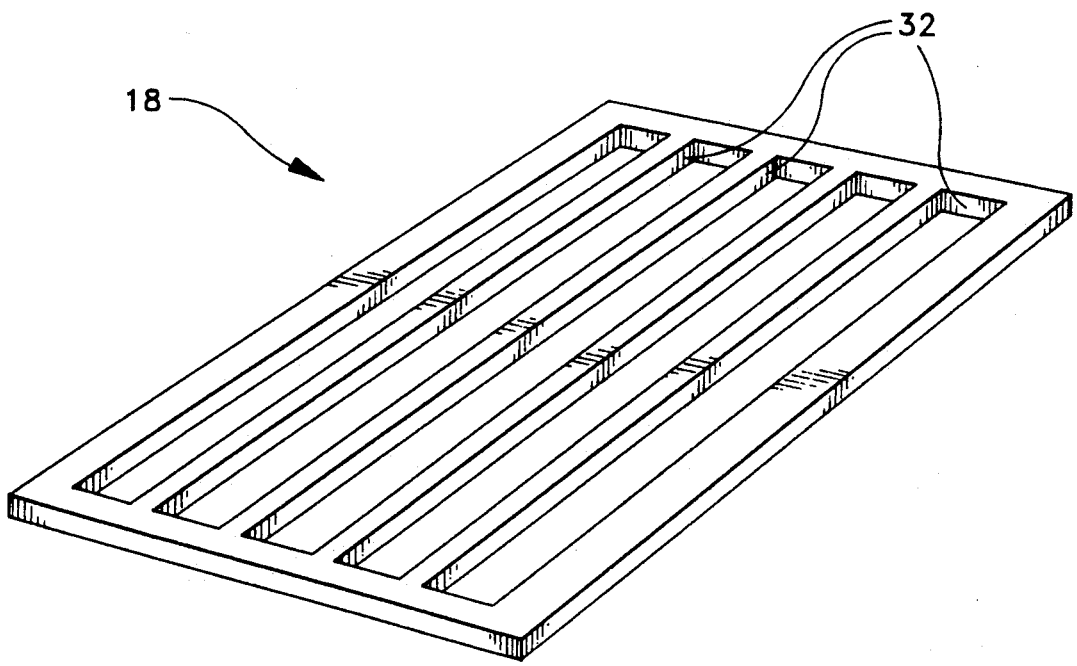
FIG. 3 is an enlarged perspective view of an anode element of the device depicted in FIGS. 1 and 2.

FIG. 3 illustrates the preferred form of the vertical anode elements. As can be seen, the elements are slotted or tined. It is preferred that 640 horizontal elements be deposited upon the anode screen having an overall width of 112 micrometers, a length approximating the viewing screen width and separated one from the next in the vertical direction by a space of 15 micrometers. Groups of 24 horizontal elements are electrically connected at the ends thus giving approximately 26 horizontal anode element groups corresponding to 25 lines of character text to be displayed and erased and an additional border area. It is preferred that 1280 vertical anode elements be deposited upon the anode screen (atop the $SiO_2$ layer 22 and anode insulator strips 24), each having a slotted configuration as shown in FIG. 3 and an overall width of 112 micrometers, a length approximating the viewing screen height and separated one from the next in the horizontal direction by a space of 15 micrometers. Groups of 16 vertical elements (not just the tines) are connected at the ends thus giving 80 vertical anode element groups corresponding to the 80 columns of character text to be displayed and erased. It is preferred that the slots in the vertical anode elements be extended through the insulation layer (strips) 24 as is taught in U.S. Pat. No. 4,742,345.

Figure 4:
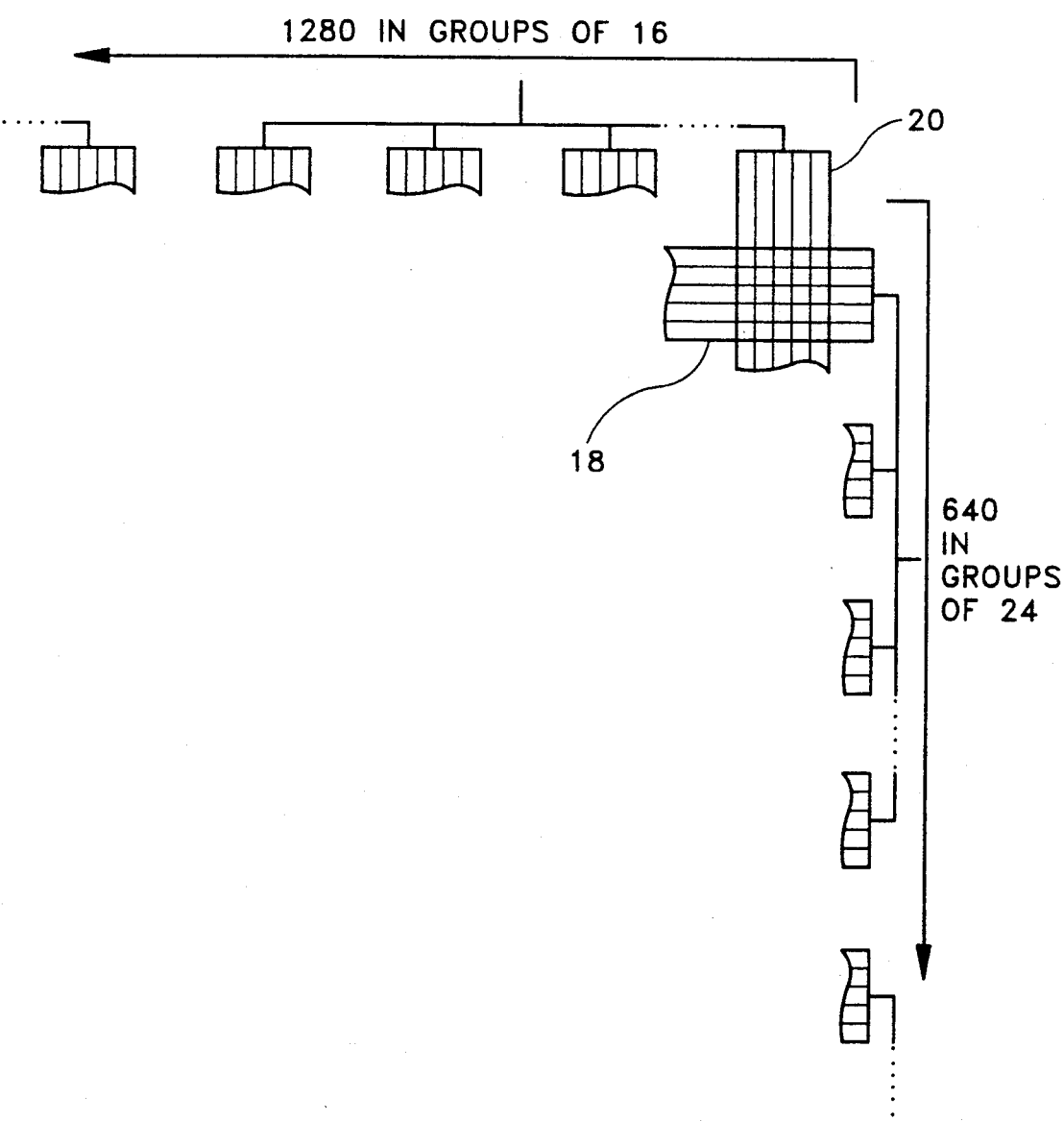
FIG. 4 is a diagram of a portion of the anode of the display shown in FIGS. 1 and 2 showing an exemplary grouping of anode elements.

FIG. 4 diagrammatically depicts the grouping of horizontal 18 and vertical 20 anode elements.

In operation, the anode matrix may be used in conjunction with the cathode and grid to selectively erase single characters at the intersection of particular horizontal 18 and vertical 20 anode element groups, or may be operated as a monolithic anode. For example, in single character erase mode, all horizontal (outer) anode elements 18 may be set positive relative to the cathode, grid and vertical (inner) anode elements 20. When a desired character is to be erased, a selected horizontal element 18 group is made negative relative to intersecting vertical anode elements. Thus, at the intersection, and only at the intersection, is the barrier caused by the vertical element 20 group lowered and a sufficient voltage gradient established to induce pigment particle migration. In a similar manner, writing to a selected character location may be enabled or disabled.

It should be understood that the embodiments described herein are merely exemplary and that a person skilled in the art may make many variations and modifications without departing from the spirit and scope of the invention as defined in the appended claims.

We claim:

1. An electrophoretic display comprising:
   (a) a fluid-tight envelope having a portion thereof which is at least partially transparent;
   (b) an electrophoretic fluid contained within said envelope, said fluid having pigmented particles suspended therein;
   (c) a first plurality of elongated substantially parallel horizontal conductor members disposed within a first plane and contained within said envelope;
   (d) a first plurality of elongated substantially parallel vertical conductor members contained within said envelope electrically insulated from said horizontal members and disposed within a second plane, said first and said second planes being substantially parallel, said first plurality of horizontal members and said first plurality of vertical members forming a first matrix with a plurality of intersections when viewed along a line perpendicular to said first and said second planes;
   (e) a second plurality of elongated substantially parallel horizontal conductor members disposed within a third plane and contained within said envelope;
   (f) a second plurality of elongated substantially parallel vertical conductor members contained within said envelope electrically insulated from said second plurality of horizontal members and disposed within a fourth plane, said third and said fourth planes being substantially parallel, said second plurality of horizontal members and said second plurality of vertical members forming a second matrix with a plurality of intersections when viewed along a line perpendicular to said third and said fourth planes, said second and said third planes being substantially parallel, each of said vertical and horizontal members in said first and second matrices being selectively electrically chargeable to induce movement of said particles within said fluid, said particles being at least partially visible through said transparent portion of said envelope.

2. The device of claim 1, wherein said envelope includes a first flat faceplate, a central portion of which is said transparent portion of said envelope, said first faceplate being a substrate for supporting said first plurality of horizontal conductor members.

3. The device of claim 2, wherein said envelope includes a second substantially flat faceplate and a wall member interposed between and sealably attached to said first and second faceplates to form said envelope, said second matrix being positioned proximate said second faceplate.

4. The apparatus of claim 3, wherein said first plurality of vertical members are at least partially insulated from said first plurality of horizontal members by an insulator strip underlying each of said vertical members and parallel thereto.

5. The device of claim 4, wherein said first plurality of vertical members is further insulated from said first plurality of horizontal members by a layer of semiconductor material deposited over said horizontal members.

6. The device of claim 5, wherein each of said first plurality of horizontal members and each of said first plurality of vertical members are slotted and said insulator strips underlying said vertical members are slotted with slots aligning with the slots in said vertical members.

7. The device of claim 6, wherein said first plurality of horizontal members are grouped into electrically connected groups, each of said groups having a height approximating the height of a displayable character, and wherein said first plurality of vertical members are grouped into electrically connected groups, each of said groups having a width approximating the width of a displayable character, such that the area of intersection of a first horizontal member and a first vertical member approximates the area of a single displayable character.

8. The device of claim 7, wherein said semi-conductor is Silicon Dioxide.

9. The device of claim 8, wherein said second faceplate is a substrate for supporting said second plurality of horizontal conductor members and wherein said second plurality of vertical members are at least partially insulated from said second plurality of horizontal members by an insulator strip underlying each of said vertical members and parallel thereto, said first and second plurality of horizontal conductor members being aligned and said first and second plurality of vertical conductor members being aligned.

10. The device of claim 9, wherein said device is a triode-type device, said first matrix being the anode, said second plurality of horizontal elements being the cathode and said second plurality of vertical members being the grid.

11. The device of claim 10, wherein said second faceplate is at least partially transparent and said electrophoretic fluid is visible therethrough.

12. The device of claim 8, wherein said second faceplate is a substrate for supporting said second plurality of vertical conductor members and wherein said second plurality of horizontal members are at least partially insulated from said second plurality of vertical members by an insulator strip underlying each of said horizontal members and parallel thereto, said first plurality of horizontal conductor members being aligned with said second plurality of vertical members and said first plurality of vertical conductor members being aligned with said second plurality of horizontal members.

13. The device of claim 12, wherein said device is a triode-type device, said first matrix being the anode, said second plurality of vertical elements being the cathode and said second plurality of horizontal members being the grid.

14. The device of claim 13, wherein said second faceplate is at least partially transparent and said electrophoretic fluid is visible therethrough.

15. In an electrophoretic display having the capacity for displaying character data, the improvement therewith of,
means for selectively erasing at least one display character with an electrostatic charge without erasing other displayed characters said erasing means including a first addressable X-Y matrix for selectively establishing a discrete said electrostatic charge at at least one intersection of said matrix for erasing said at least one displayed character on said display.

16. The apparatus of claim 15, wherein said first X-Y matrix is composed of a first plurality of conductor members in the X direction and a second plurality of conductor members in the Y direction insulated from said first plurality.

17. In an electrophoretic display having the capacity for displaying character data, the improvement therewith of means for selectively erasing at least one displayed character with an electrostatic charge without erasing other displayed characters, said erasing means including a first addressable X-Y matrix for selectively establishing a discrete said electrostatic charge at at least one intersection of said matrix, said first addressable X-Y matrix having a first plurality of conductor members in the X-direction and a second plurality of conductor members in the Y-direction insulated from said first plurality, said erasing means further including a second addressable X-Y matrix for selectively establishing discrete electrostatic charges at intersections of said second matrix for writing pixel data on said display.

18. The apparatus of claim 17, wherein said second X-Y matrix is composed of a first plurality of conductor members in the X direction and a second plurality of conductor members in the Y direction insulated from said first plurality.

19. The apparatus of claim 18, wherein said first and second matrices are substantially parallel and the intersections thereof occupy fixed positions relative to each other.

20. The apparatus of claim 19, wherein said intersections of said first matrix and said intersections of said second matrix exhibit a fixed relative alignment such that each intersection of said second matrix is spatially associated with a corresponding intersection of said first matrix.

21. The apparatus of claim 20, wherein said X and Y conductor members of said first and second matrices may assume voltage levels such that at the respective intersections thereof display data may be written and erased under the control of an electrostatic field established between said corresponding intersections.

22. The apparatus of claim 21, wherein each of said intersections of said second matrix serves as the loci for a displayable pixel and said intersections of said first matrix have an area at least as small as the area of a displayable character composed of displayable pixels.

23. The apparatus of claim 22, wherein said display is of the triode-type, said first matrix constituting the anode, said X conductor members of said second matrix constituting the cathode and said Y lines of said second matrix constituting the grid.

24. A method for selectively erasing at least one character from an electrophoretic display comprises the steps of:
(a) imposing a set of voltage levels upon the ordinate and abscissa lines of a first addressable X-Y matrix of conductor members contained within said display such that at at least one selected intersection in said matrix an electrostatic field is created which erases a character displayed on said display proximate to said at least one intersection.

25. A method for selectively erasing at least one character from an electrophoretic display comprising the steps of:
imposing a set of voltage levels upon the ordinate and abscissa lines of a first addressable X-Y matrix of conductor members contained within said display such that at at least one selected intersection in said matrix an electrostatic field is created which erases a character displayed on said display proximate to said at least one intersection and wherein said display includes a second X-Y matrix having a plurality of intersecting conductor members for writing pixel data at the intersections thereof, said intersections of said second matrix and said intersections of said first matrix having a functional relationship such that when said step of erasing is initiated at an intersection of said first matrix, a predetermined set of pixels of at least one in number are erased at said second matrix if previously in the written state.

26. The method of claim 25, wherein said electrostatic field present at said at least one intersection of said first matrix during said step of erasing establishes a voltage gradient between said at least one intersection and said intersections of said second matrix proximate said predetermined set of pixels, said gradient causing a migration of pigment particles through the electrophoretic fluid of said display away from a display position and into an erase position.

* * * * *